US011070554B2

(12) United States Patent
Pratt et al.

(10) Patent No.: US 11,070,554 B2
(45) Date of Patent: Jul. 20, 2021

(54) AUTHENTICATION MODULE FOR MOBILE DEVICES

(71) Applicant: PayPal, Inc., San Jose, CA (US)

(72) Inventors: Nathan Robert Pratt, Scottsdale, AZ (US); Bradley Wardman, Phoenix, AZ (US); Meethil Vijay Yadav, Scottsdale, AZ (US); Nicole Harris, Mesa, AZ (US)

(73) Assignee: PayPal, Inc., San Jose, CA (US)

( * ) Notice: Subject to any disclaimer, the term of this patent is extended or adjusted under 35 U.S.C. 154(b) by 342 days.

(21) Appl. No.: 15/966,911

(22) Filed: Apr. 30, 2018

(65) Prior Publication Data

US 2019/0334896 A1 Oct. 31, 2019

(51) Int. Cl.
*H04L 29/06* (2006.01)
*G06F 16/955* (2019.01)

(52) U.S. Cl.
CPC ........ *H04L 63/0876* (2013.01); *G06F 16/955* (2019.01)

(58) Field of Classification Search
CPC ............................ H04L 63/0876; G06F 16/955
See application file for complete search history.

(56) References Cited

U.S. PATENT DOCUMENTS

| 8,819,819 B1 | 8/2014 | Johnston et al. | |
| 2009/0165100 A1* | 6/2009 | Sasamura | H04L 63/0815 726/5 |
| 2009/0228780 A1* | 9/2009 | McGeehan | H04L 63/1441 715/234 |
| 2011/0247045 A1* | 10/2011 | Rajagopal | H04L 63/1441 726/1 |
| 2014/0047518 A1* | 2/2014 | Pravetz | H04L 63/08 726/5 |
| 2016/0381047 A1* | 12/2016 | D'Aveta | H04L 67/02 726/23 |
| 2017/0078326 A1* | 3/2017 | Child | H04L 63/1483 |

OTHER PUBLICATIONS

Stuart Jacobs; Security Systems Engineering; Wiley-IEEE Press 2011 (Edition: 1, pp. 512); (Year: 2011).*
M. Sharmin • S.I. Ahamed • S. Ahmed • Haifeng Li; A Privacy-aware Trust and Security Model for Resource Discovery in Pervasive Computing Environment; 30th Annual International Computer Software and Applications Conference (COMPSAC'06) (vol. 2, pp. 67-70); (Year: 2006).*
Barisch, M.; Design and Evaluation of an Architecture for Ubiquitous User Authentication Based on Identity Management Systems; 2011IEEE 10th International Conference on Trust, Security and Privacy in Computing and Communications (pp. 863-872); (Year: 2011).*

* cited by examiner

*Primary Examiner* — Luu T Pham
*Assistant Examiner* — Chao Wang
(74) *Attorney, Agent, or Firm* — Haynes and Boone, LLP (57) ABSTRACT

A computer system determines that authentication information has been requested from a user device by a requesting device. In response to determining that authentication information has been requested by the requesting device, the computer system identifies information corresponding to the requesting device and determines if one or more risk indications correspond to the identified information corresponding to the requesting device. In response to determining that one or more risk indications correspond to the identified information corresponding to the requesting device, the computer system implements one or more security measures.

20 Claims, 5 Drawing Sheets

AUTHENTICATION MODULE FOR MOBILE DEVICES

TECHNICAL FIELD

The present disclosure relates to mobile devices, and more particularly to providing security measures for authentication requests received on mobile devices.

BACKGROUND

Today, with the availability of mobile devices, users are able to have the power to make digital payments, access social media accounts, access financial account, and/or access almost any information no matter where they are. In most cases, accessing these personal accounts involves a user inputting certain authentication credentials. If a user is utilizing a laptop, oftentimes a browser on a laptop may utilize browser blacklists to determine if a website that a user is visiting is not "blacklisted" or a potentially "malicious website". However, browsers and applications on mobile device do not have similar capabilities to check for malicious websites (and therefore cannot utilize these techniques), which may allow a fraudster an opportunity to gather authentication credentials from a mobile device user by utilizing fraud techniques such as "phishing". An improved fraud prevention method may help authentication credentials of mobile device users from falling into the wrong hands.

DETAILED DESCRIPTION

Embodiments of the present disclosure provide a system, method, and program product. A computer system determines that authentication information has been requested from a user device by a requesting device. In response to determining that authentication information has been requested by the requesting device, the computer system identifies information corresponding to the requesting device and determines if one or more risk indications correspond to the identified information corresponding to the requesting device. In response to determining that one or more risk indications correspond to the identified information corresponding to the requesting device, the computer system implements one or more security measures.

In further embodiments, a computer system determines that authentication information has been transmitted from a user device to a requesting device. In response to determining that authentication information has been transmitted to the requesting device, the computer system marks one or more resource pages corresponding to a request for the authentication information that preceded the transmission. The computer system identifies information corresponding to the requesting device and determines if one or more risk indications correspond to the identified information corresponding to the requesting device. In response to determining that one or more risk indications correspond to the identified information corresponding to the requesting device, the computer system implements one or more security measures.

As stated above, browsers and applications on mobile devices do not have the capability to identify malicious websites that are potentially fraudulent. This leaves mobile devices users susceptible to "phishing attacks" and other fraudster attacks. In the example embodiment, the present disclosure describes a solution that provides a system, method, and program product for identifying potentially malicious resource pages and further taking one or more security measures to protect a user's authentication information. In the example embodiment, the present disclosure describes a solution that monitors device activity and determines whether authentication credentials are being requested. For example, authentication credentials may be requested when logging into a financial account. In response to determining that the device has received a request for authentication credentials, the present disclosure describes a solution that identifies and analyzes information associated with the requesting entity, and further determines if the information corresponds to one or more risk flags. If the present disclosure determines that the information corresponds to one or more risk flags, the present solution may take one or more security measures such as disallowing the input of authentication credentials, intercepting authentication credentials so they are not transmitted to the requesting entity, and/or notifying the user of the risk flags.

Furthermore, in further embodiments, the present disclosure describes a solution for identification of risk flags after authentication credentials have been transmitted to the requesting entity. In these further embodiments, the present disclosure describes a solution that detects that the device has transmitted authentication credentials to a requesting entity. In response to detecting the device has transmitted authentication credentials to a requesting entity, the present disclosure describes marking the webpage or application corresponding to the requesting entity, and further checking for risk flags. If risk flags are detected, the present disclosure describes notifying the user and removing authentication credentials stored in correspondence with the webpage or application.

Embodiments of the present disclosure will now be described in detail with reference to the accompanying Figures.

Figure 1:
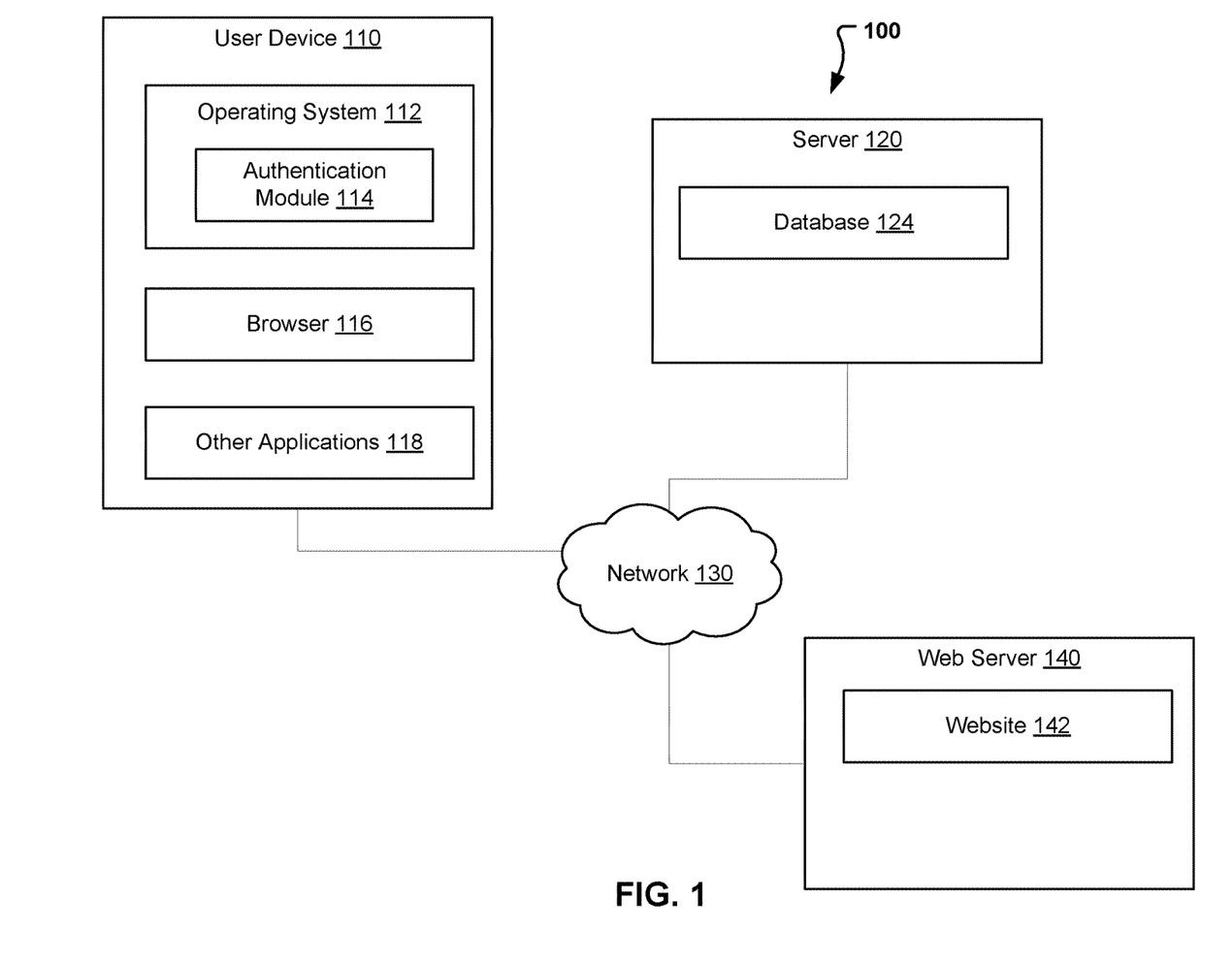
FIG. 1 illustrates an authentication system, in accordance with an embodiment.

FIG. 1 illustrates authentication system 100, in accordance with an embodiment. In the example embodiment, authentication system 100 includes user device 110, server 120, and web server 140 interconnected via network 130.

In the example embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a Bluetooth network, a local area network (LAN), or a wide area network (WAN). In general, network 130 can be any combination of connections and protocols that will support communications between computing devices, such as between user device 110 and web server 140.

In the example embodiment, server 120 includes database 124. In the example embodiment, server 120 may be a desktop computer, a laptop computer, a tablet computer, a mobile device, a handheld device, a thin client, or any other electronic device or computing system capable of receiving and sending data to and from other computing devices, such as user device 110, via network 130. Although not shown, optionally, server 120 can comprise a cluster of servers executing the same software to collectively process requests as distributed by a front-end server and a load balancer. Server 120 is described in more detail with regard to the figures.

In the example embodiment, database 124 is a storage device that includes information corresponding to one or more risk flags. In the example embodiment, database 124 may include information such as blacklisted uniform resource locators (URL), blacklisted IP addresses, blacklisted autonomous system numbers (ASNs), blacklisted domain names, blacklisted company names, blacklisted locations (addresses, cities, states, countries, regions, etc.), blacklisted applications (or hashes of application files), blacklisted phone numbers, blacklisted usernames, blacklisted email addresses, blacklisted developer websites, and/or additional information (including other types of blacklists) that may be used to determine if a website or a request for information is a "phishing attempt". Database 124 is described in further detail with regard to the figures.

In the example embodiment, web server 140 includes website 142. In the example embodiment, web server 140 may be a desktop computer, a laptop computer, a tablet computer, a mobile device, a handheld device, a thin client, or any other electronic device or computing system capable of receiving and sending data to and from other computing devices, such as user device 110, via network 130. Furthermore, in the example embodiment, web server 140 is a computing device that is optimized for the support of websites that reside on web server 140, such as website 142, and for the support of network requests related to websites, which reside on webs server 140. Although not shown, optionally, web server 140 can comprise a cluster of servers executing the same software to collectively process requests as distributed by a front-end server and a load balancer. Web server 140 is described in more detail with regard to figures.

In the example embodiment, website 142 is a collection of files including, for example, HTML files, CSS files, image files and JavaScript files. Website 142 can also include other resources such as audio files and video files.

In the example embodiment, user device 110 includes browser 116, other applications 118, and operating system 112. Furthermore, while in the example embodiment, user device 110 is a mobile device, in other embodiments, user device 110 may be a desktop computer, a laptop computer, a tablet computer, a handheld device, a thin client, or any other electronic device or computing system capable of receiving and sending data to and from other computing devices, such as web server 140, via network 130. User device 110 is described in more detail with reference to the figures.

In the example embodiment, browser 116 is an application that is capable of communicating with other computing devices to transmit request and a receive information. Furthermore, browser 116 is capable of displaying received information to the user of user device 110. In the example embodiment, browser 116 may transmit a request to website 142, and further receive webpage information from website 142. Browser 116 is described in further detail with regard to the figures.

In the example embodiment, other applications 118 include one or more applications that are present on user device 110. In the example embodiment, other applications 118 may also be capable of transmitting requests to one or more servers and furthermore receiving information back from the one or more servers. Other applications 118 are described in further detail with regard to the figures.

In the example embodiment, operating system 112 includes authentication module 114. Authentication module 114 is a software component of operating system 112 that may be capable of detecting if user device 110 has received a request for authentication credentials. Further, authentication module 114 may be capable of determining information corresponding to the requestor of the authentication credentials (such as identification information), and additionally, capable of analyzing the information to determine if the information corresponds to one or more risk flags. In addition, if authentication module 114 determines that the information corresponds to one or more risk flags, authentication module 114 is capable of taking one or more actions to prevent authentication credentials from being transmitted to the requestor. While in the example embodiment authentication module 114 is a component of the operating system, in other embodiments, authentication module 114 may be a stand-alone program or application. Operating system 112 and authentication module 114 are described in further detail with regard to the figures.

Furthermore, in one or more embodiments, authentication module 114 may utilize an application programming interface (API) in communicating with browser 116, other applications 118, and further in communicating with database 124.

Figure 2:
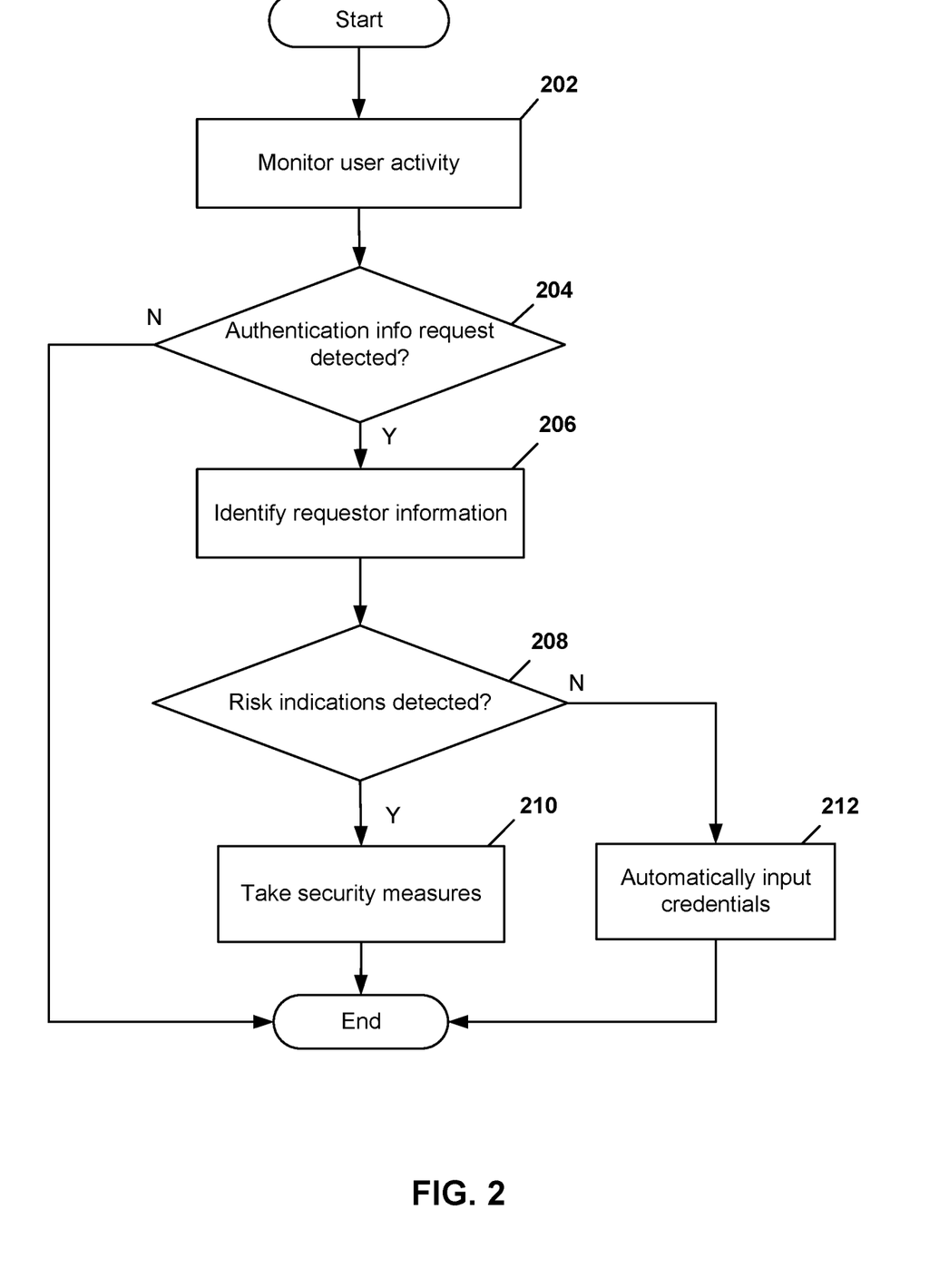
FIG. 2 is a flowchart illustrating the operations of the authentication module of FIG. 1 in detecting if authentication information has been requested, and based on the detecting, determining whether to take one or more security measures, in accordance with an embodiment.

FIG. 2 is a flowchart illustrating the operations of authentication module 114 in detecting if authentication information has been requested, and based on the detecting, determining whether to take one or more security measures, in accordance with an embodiment. In the example embodiment, authentication module 114 monitors user activity on user device 110 (step 202). In the example embodiment, authentication module 114 may monitor browsing activity being conducted on browser 116, and further may monitor activity on one or more applications on user device 110, such as other applications 118.

In the example embodiment, authentication module 114 detects whether authentication information have been requested (decision 204). In the example embodiment, authentication information may include personal information, financial information, login information, or any other type of sensitive information. In the example embodiment, authentication module 114 may analyze the user interface elements contained within a user interface displayed on user device 110, and determine if the user interface elements correspond to authentication information. For example, in monitoring activity on user device 110, such as browsing activity being conducted on browser 116, authentication module 114 may determine whether authentication information is being requested by analyzing webpage information being displayed to the user of user device 110 to determine if any authentication information fields are present within the webpage. For example, authentication module 114 may determine if authentication information is present within a webpage by searching for common HTML elements (text boxes, text area, input fields, forms, submit buttons, etc.) and/or by searching for strings indicating the request of personal information ("username", "password", "credit card number", "address", "login", etc.).

If authentication module 114 detects that authentication information has not been requested (decision 204, "NO" branch), authentication module 114 continues to monitor user activity as stated above. If authentication module 114 detects that authentication information has been requested (decision 204, "YES" branch), authentication module 114 identifies information corresponding to the requestor (step 206) and further identifies if there are any risk indications associated with the requestor (decision 208). For example, upon a webpage being retrieved from web server 140 and loaded/displayed on user device 110 by browser 116, authentication module 114 may analyze the webpage and identify that the webpage includes one or more input fields requesting a form of authentication information from the user of user device 110. Authentication module 114 may then identify information corresponding to the requestor (i.e., the owner or administrator associated with website 142, the server hosting the website, the hosting provider hosting the website, etc.). In one or more embodiments, authentication module 114 may analyze website information and further may analyze a Secure Sockets Layer (SSL) Certificate associated with website 142 to identify requestor information. Authentication module 114 may then cross-reference the requestor information against risk indications contained in database 124 ( ) and determine if the requestor information is associated with any risk indications. For example, authentication module 114 may analyze the SSL certificate corresponding to website 142 and determine that the owner of the website (determined, for example, by an email address, a name, an address, a hosting IP address, a hosting company, etc) is a Nigerian company that is blacklisted (or alternatively, may determine that the owner of the website corresponding to a region that is blacklisted). In one or more embodiments, authentication module 114, along with cross-referencing against risk indications contained in database 124, authentication module 114 may additionally cross-reference against one or more threat feeds and/or one or more risk scoring systems in order to identify if the requestor information corresponds to one or more risk indications.

If authentication module 114 determines that the requestor information does correspond to one or more risk indications contained in database 124 (decision 208, "YES" branch), authentication module 114 may take one or more security measures (step 210). In the example embodiment, the security measures may include notifying the user that their authentication information should not be input (and/or submitted), and/or may additionally include disallowing the input of authentication information into the authentication fields. For example, authentication module 114 may alter the user interface of browser 116 by "darkening" the authentication fields (make the authentication fields inactive) and not allow input to be entered into the fields (or may utilize one or more similar techniques to disallow input into the fields). In one or more embodiments, rather than "darkening", the user interface elements corresponding to the authentication fields may be altered in another way, such as highlighting the fields, outlining the fields, overlaying another user interface element on top of the fields, or utilizing a color coding scheme to make it apparent to the user that one or more risk indications have been identified. Security measures may additionally include authentication module intercepting authentication information to prevent transmission to web server 140. For example, after input of credential information, authentication module 114 may detect that a user has selected a transmission or "submit" interface element (for example by utilizing one or more components of operating system 112), and upon the detection, authentication module 114 may intercept the credential information and provide a notification to the user that the transmission has been interrupted due to one or more potential risk factors. The user may further be provided to override the security measure and transmit the information regardless of the potential risk factors. Additionally, the security measures may include determining if one or more records in database 124 need to be updated and further, based on the determining, updating the records. For example, if the uniform resource locator (URL) of the requestor corresponds to a risk indicator contained in database 124 but the other information corresponding to the requestor (such as other information contained in the SSL certificate) is not contained in database 124, authentication module 114 may update one or more records in database 124 to include the other information corresponding to the requestor. This allows for future risk indication queries to yield more accurate results.

If authentication module 114 determines that the requestor information does not correspond to any risk indications (decision 208, "NO" branch), authentication module 114 may automatically input the authentication information of the user into the authentication fields on the webpage (step 212). In one or more embodiments, authentication module 114 may analyze the authentication fields on the webpage, identify the authentication information requested and retrieve the authentication information from a credential database. Furthermore, in the example embodiment, authentication module 114 may periodically update the record in the credential database corresponding to the user of user device 110 so that the authentication information corresponding to the user of user device 110 is up to date. In other embodiments, authentication module may utilize existing device functionality present on user device 110, such as the "iCloud Keychain®" (iCloud keychain is a registered trademark of Apple, Inc.) to automatically input authentication information of the user.

In other embodiments, rather than automatically inputting the authentication information into the corresponding authentication fields, authentication module 114 may allow the input of authentication information by the user of user device 110 without restriction.

In one or more embodiments, as stated above, authentication module 114 may monitor activity on applications running on user device 110, such as other applications 118, and detect whether authentication information is being requested via an application of the other applications 118. If authentication module 114 detects that authentication information has been requested, authentication module may identify requestor information and determine if any risk indications (such as a malicious application developer, bad application risk score, and/or known malware hashes) have been detected, in a similar manner as described above. Furthermore, authentication module 114 may take one or more security measures, as described above, in response to determining that one or more risk indications are associated with the request.

Figure 3:
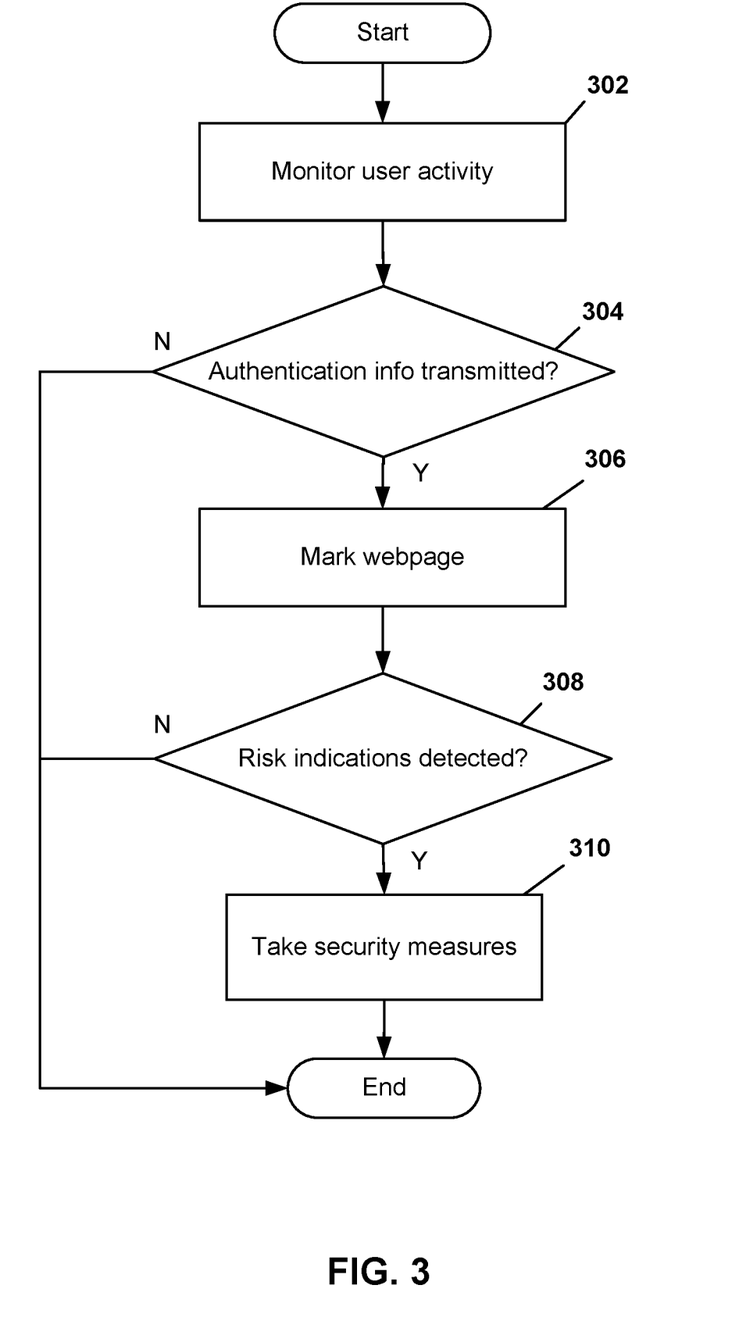
FIG. 3 is a flowchart illustrating the operations of the authentication module of FIG. 1 in detecting if authentication information has been input, and based on the detecting, determining whether the take one or more security measures, in accordance with an embodiment.

FIG. 3 is a flowchart illustrating the operations of authentication module 114 in detecting if authentication information has been input, and based on the detecting, determining whether the take one or more security measures, in accordance with an embodiment. In the example embodiment, authentication module 114 monitors user activity on user device 110 (step 302). In the example embodiment, authentication module 114 may monitor browsing activity being conducted on browser 116, and further may monitor activity on one or more applications on user device 110, such as other applications 118.

In the example embodiment, authentication module 114 detects whether authentication information has been transmitted to a requesting device, such as web server 140 (decision 304). In the example embodiment, as stated above, authentication information may include personal information, financial information, login information, or any other type of sensitive information. In the example embodiment, in monitoring activity on user device 110, such as browsing activity being conducted on browser 116, authentication module 114 may determine whether authentication information has been input into a user interface displayed to the user of user device 110. For example, authentication module 114 may determine if any authentication information fields are present within the webpage, and then further determine if any information has been input into the authentication information fields. For example, authentication module 114 may determine if authentication information is present within a webpage by searching for common HTML elements (text boxes, text area, input fields, forms, submit buttons, etc.) and/or by searching for strings indicating the request of personal information ("username", "password", "credit card number", "address", "login", etc.). Furthermore, in the example embodiment, authentication module 114 may determine if the authentication information has been transmitted to a requesting device.

If authentication module 114 detects that authentication information has not been transmitted to a requesting device (decision 204, "NO" branch), authentication module 114 continues to monitor user activity as stated above. If authentication module 114 detects that authentication information has been transmitted to a requesting device (decision 204, "YES" branch), authentication module 114 marks the webpage (step 306) and further identifies if there are any risk indications associated with the requestor (decision 308). For example, upon determination that authentication information has been transmitted, authentication module 114 may mark the webpage, and further analyze information corresponding to the requestor (i.e., the owner or administrator associated with website 142, the server hosting the website, the hosting provider hosting the website, etc.). As stated above, in one or more embodiments, authentication module 114 may analyze website information and further may analyze a Secure Sockets Layer (SSL) Certificate associated with website 142 to identify requestor information. Authentication module 114 may then cross-reference the requestor information against risk indications contained in database 124 and determine if the requestor information is associated with any risk indications. Furthermore, as stated above, threat feeds, additional blacklists not contained in database 124, and risk scoring systems may also be utilized in determining if the requestor information is associated with any risk indications. In other embodiments, upon detecting authentication information has been transmitted, authentication module 114 may mark the webpage and may analyze if there are risk indications associated with the requestor at a later time. For example, authentication module 114 may analyze if there are risk indications associated with the marked webpages periodically, such as at the end of each business day, at the end of the week, or at the end of the month. If authentication module 114 determines that the requestor information does correspond to one or more risk indications (decision 308, "YES" branch), authentication module 114 may take one or more security measures (step 310). In the example embodiment, the security measures may include notifying the user (such as an email, text message or phone call notification) that the corresponding transmitted authentication information may be at risk. In addition, authentication module 114 may additionally recommend further security actions (such as changing a password, deleting an account, changing or removing certain financial or personal information, etc.). Furthermore, the security measure may additionally include, as stated above, determining if one or more records in database 124 need to be updated and further, based on the determining, updating the records. Furthermore, in one or more embodiments, user input may be requested with regard to each of the marked webpages that correspond to one or more risk indications. If the user provides input that communication with a particular requesting device is okay, then authentication module 114 may update one or more records in database 124 to reflect that. If authentication module 114 determines that the requestor information does not correspond to any risk indications (decision 308, "NO" branch), authentication module 114 continues to monitor user activity as described above.

Furthermore, in one or more embodiments, upon initial load, authentication module 114 may be configured to analyze user history, including application usage and websites visited to determine if the user has transmitted authentication information to a requesting device that corresponds to one or more risk indications. Furthermore, if authentication module 114 determines that authentication information has been transmitted to a requesting device that corresponds to one or more risk indications, authentication module 114 may notify the user, in a similar manner as described above, and further may recommend further security actions (such as changing a passwords, deletion of an account, changing or removing certain financial or personal information, etc.). In other embodiments, authentication module 114 may analyze the communication between user device 110 and the requesting device after communication has ended. In this other embodiment, authentication module 114 may identify, after the communication has ended, whether any part of the communication included a transmission of authentication information from user device 110 to the requesting device. If authentication module 114 determines that the communication includes the transmission of authentication information from user device 110 to the requesting device, authentication module 114 may mark the webpage and determine if any risk indications are associated with the requestor, as described above.

In one or more embodiments, as stated above, authentication module 114 may monitor activity on applications running on user device 110, such as other applications 118, and detect whether authentication information has been transmitted via an application of the other applications 118. If authentication module 114 detects that authentication information has been transmitted, authentication module may mark the application page, and further identify requestor information and determine if any risk indications (such as a malicious application developer, bad application risk score, and/or known malware hashes) have been detected, in a similar manner as described above. Furthermore, authentication module 114 may take one or more security measures, as described above, in response to determining that one or more risk indications are associated with the request.

Furthermore, in or more embodiments, prior to the transmission of authentication information by user device 110 to the requesting device, authentication module 114 may hold the authentication information in a queue temporarily until it has been determined that the requesting device does not correspond to one or more risk indications. If authentication module 114 determines that the requesting device does not correspond to one or more risk indications, authentication module 114 may allow transmission of the authentication information to the requesting device.

Figure 4:
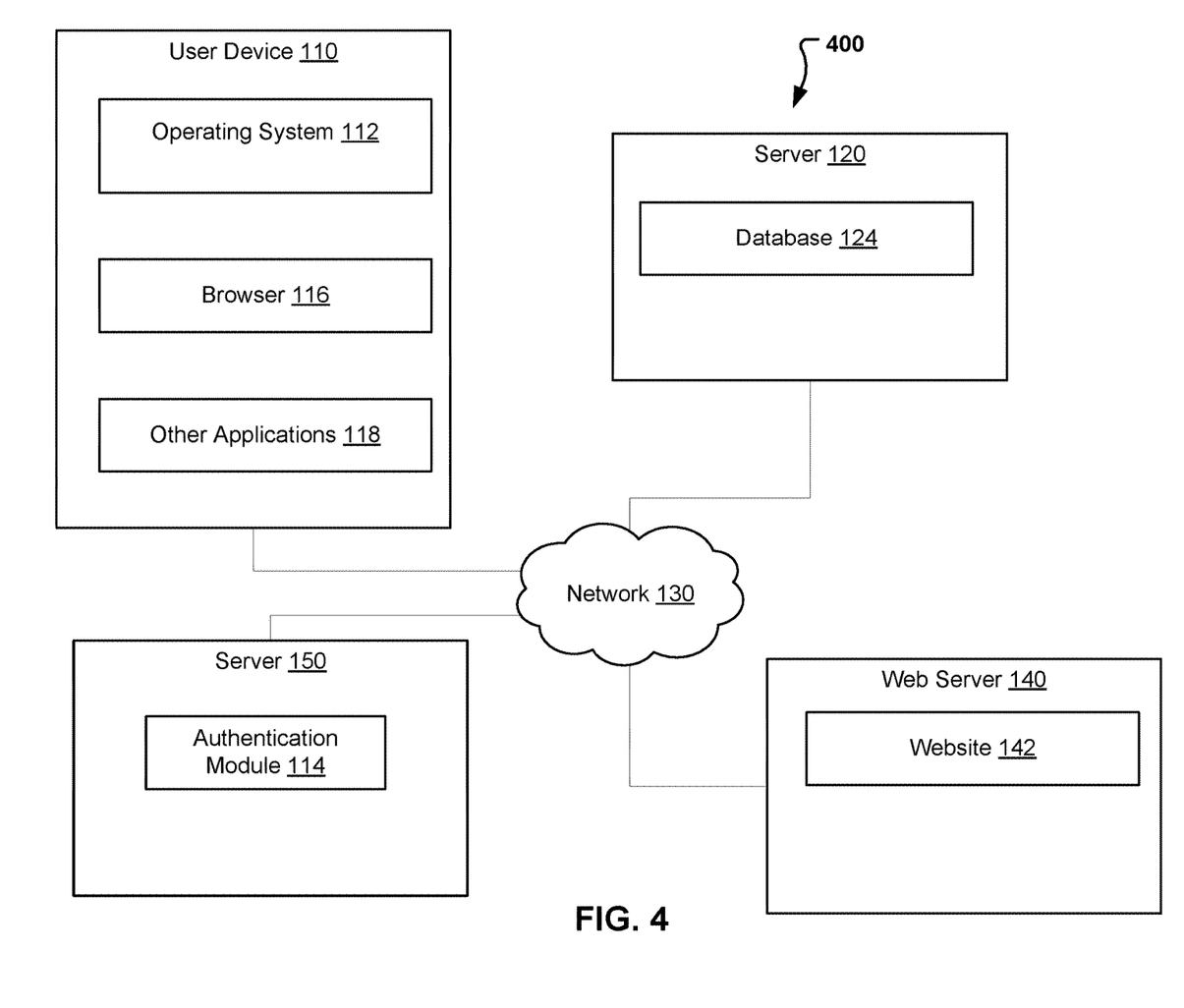
FIG. 4 illustrates an alternate embodiment of the authentication system of FIG. 1, in accordance with an embodiment.

FIG. 4 illustrates an alternate embodiment of the authentication system of FIG. 1, in accordance with an embodiment. In the example embodiment, FIG. 4 depicts an authentication system 400 where authentication module 114 is located on remote server 150. In the example embodiment, authentication module 114 monitors user activity on user device 110 via network 130, or alternatively, may monitor user activity by communicating with a client authentication module. In the example embodiment, authentication module 144 may represent a server side program that may monitor user activity and perform the steps discussed in FIGS. 2 and 3 for a number of client devices.

The foregoing description of various embodiments of the present disclosure has been presented for purposes of illustration and description. It is not intended to be exhaustive nor to limit the disclosure to the precise form disclosed. Many modifications and variations are possible. Such modifications and variations that may be apparent to a person skilled in the art of the disclosure are intended to be included within the scope of the disclosure as defined by the accompanying claims.

Figure 5:
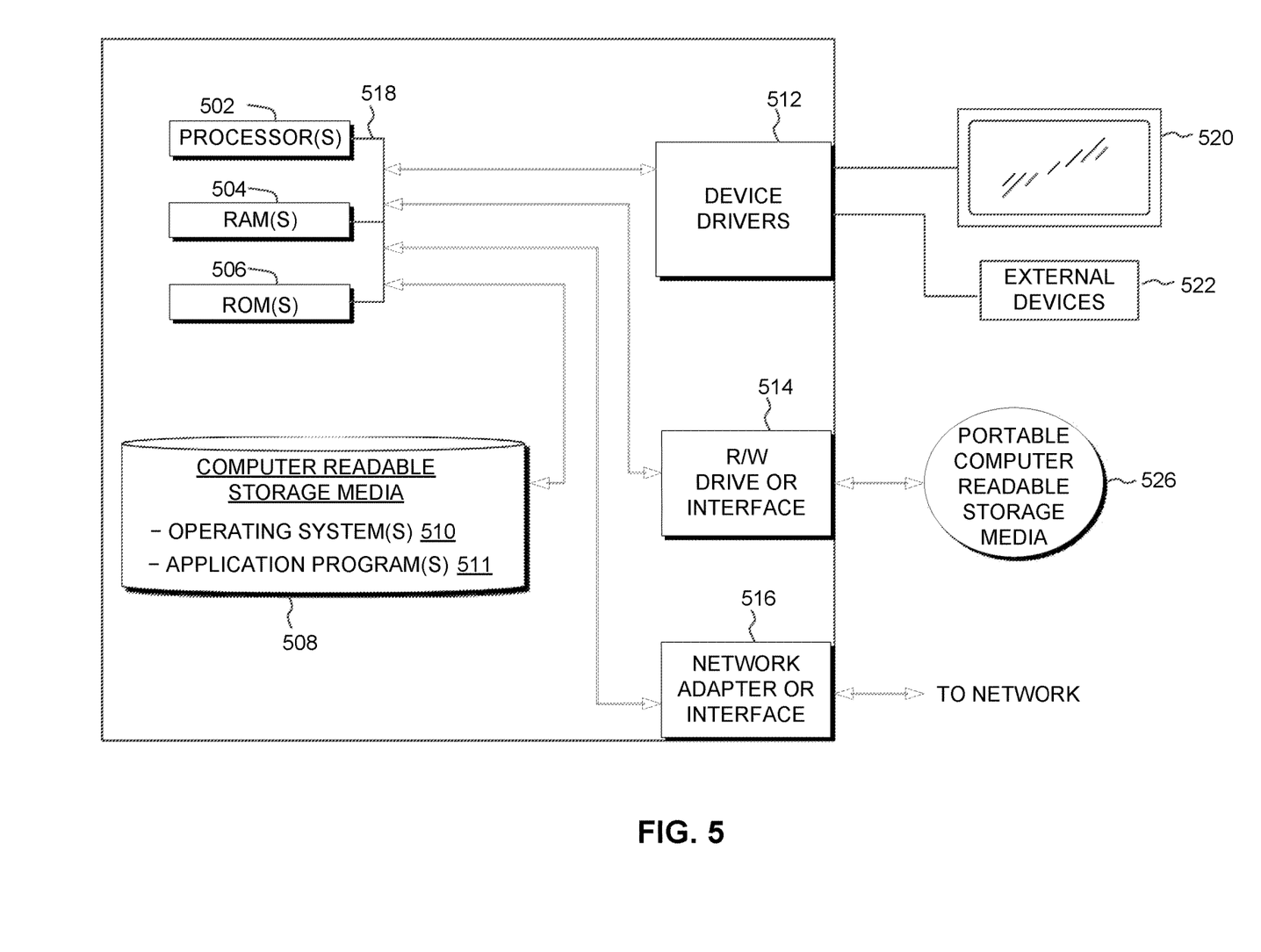
FIG. 5 is a block diagram depicting the hardware components of the authentication system of FIG. 1 and the authentication system of FIG. 4, in accordance with an embodiment.

FIG. 5 depicts a block diagram of components of computing devices contained in authentication system 100 of FIG. 1 and authentication system 400 in FIG. 4, in accordance with an embodiment. It should be appreciated that FIG. 5 provides only an illustration of one implementation and does not imply any limitations with regard to the environments in which different embodiments may be implemented. Many modifications to the depicted environment may be made.

Computing devices may include one or more processors 502, one or more computer-readable RAMs 504, one or more computer-readable ROMs 506, one or more computer readable storage media 508, device drivers 512, read/write drive or interface 514, network adapter or interface 516, all interconnected over a communications fabric 518. Communications fabric 518 may be implemented with any architecture designed for passing data and/or control information between processors (such as microprocessors, communications and network processors, etc.), system memory, peripheral devices, and any other hardware components within a system.

One or more operating systems 510, and one or more application programs 511, for example, authentication module 114, are stored on one or more of the computer readable storage media 508 for execution by one or more of the processors 502 and by utilizing one or more of the respective RAMs 504 (which typically include cache memory). In the illustrated embodiment, each of the computer readable storage media 508 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing devices may also include a R/W drive or interface 514 to read from and write to one or more portable computer readable storage media 526. Application programs 511 on the computing devices may be stored on one or more of the portable computer readable storage media 526, read via the respective R/W drive or interface 514 and loaded into the respective computer readable storage media 508.

Computing devices may also include a network adapter or interface 516, such as a TCP/IP adapter card or wireless communication adapter (such as a 4G wireless communication adapter using OFDMA technology). Application programs 511 on the computing devices may be downloaded to the computing devices from an external computer or external storage device via a network (for example, the Internet, a local area network or other wide area network or wireless network) and network adapter or interface 516. From the network adapter or interface 516, the programs may be loaded onto computer readable storage media 508. The network may comprise copper wires, optical fibers, wireless transmission, routers, firewalls, switches, gateway computers and/or edge servers.

Computing devices may also include a display screen 520, and external devices 522, which may include, for example a keyboard, a computer mouse and/or touchpad. Device drivers 512 interface to display screen 520 for imaging, to external devices 522, and/or to display screen 520 for pressure sensing of alphanumeric character entry and user selections. The device drivers 512, R/W drive or interface 514 and network adapter or interface 516 may comprise hardware and software (stored on computer readable storage media 508 and/or ROM 506).

The programs described herein are identified based upon the application for which they are implemented in a specific embodiment. However, it should be appreciated that any particular program nomenclature herein is used merely for convenience, and thus the disclosure should not be limited to use solely in any specific application identified and/or implied by such nomenclature.

Based on the foregoing, a computer system, method, and computer program product have been disclosed. However, numerous modifications and substitutions can be made without deviating from the scope of the present disclosure. Therefore, the various embodiments have been disclosed by way of example and not limitation.

Various embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A mobile device, comprising:
one or more computer-readable memories storing program instructions; and
one or more processors configured to execute the program instructions to cause the mobile device to perform operations comprising:
analyzing a user interface on the mobile device, the analyzing including detecting a Hypertext Markup Language (HTML) element and/or a string associated with authentication information indicating a request for the authentication information;
determining, based on the analyzing, that the authentication information has been requested from the mobile device by a requesting device;
in response to the determining that authentication information has been requested by the requesting device, identifying requestor information corresponding to the requesting device;
detecting that a user interface element corresponding to a transmission of the authentication information has been selected on the mobile device;
accessing a blacklist database containing one or more risk indications indicating security risks to the mobile device;
determining, based on the accessing, whether the requestor information is associated with the one or more risk indications; and
in response to determining that the requestor information is associated with the one or more risk indications, implementing one or more security measures including intercepting the transmission of the authentication information prior to the authentication information being received by the requesting device and altering one or more fields of the user interface that correspond to the requested authentication information, the altering configured to prevent an entry of the requested authentication information into the mobile device and indicate to a user of the mobile device that the requestor information is associated with the one or more risk indications.

2. The mobile device of claim 1, wherein the identifying the requestor information corresponding to the requesting device includes analyzing a Secure Socket Layer (SSL) Certificate associated with the requesting device.

3. The mobile device of claim 1, wherein the authentication information includes personal information, financial information, and/or login information.

4. The mobile device of claim 1, wherein the altering the one or more fields of the user interface includes making the one or more fields of the user interface inactive.

5. The mobile device of claim 1, wherein the analyzing the user interface of the mobile device includes determining that the one or more fields contained in the user interface correspond to the authentication information.

6. A method, comprising:
- analyzing a user interface on a mobile device, the analyzing including detecting a Hypertext Markup Language (HTML) element and/or a string associated with authentication information indicating a request for the authentication information;
- determining, based on the analyzing, that authentication information has been requested from the mobile device by a requesting device;
- in response to the determining that authentication information has been requested by the requesting device, identifying requestor information corresponding to the requesting device;
- detecting that a user interface element corresponding to a transmission of the authentication information has been selected on the mobile device;
- accessing a blacklist database containing one or more risk indications indicating security risks to the mobile device;
- checking, based on the accessing, whether the requestor information is associated with the one or more risk indications; and
- implementing one or more security measures if the checking indicates the requestor information is associated with the one or more risk, the one or more security measures including intercepting the transmission of the authentication information prior to the authentication information being received by the requesting device and altering one or more fields of the user interface that correspond to the requested authentication information, the altering configured to prevent an entry of the requested authentication information into the mobile device and indicate to a user of the mobile device that the requestor information is associated with the one or more risk indications.

7. The method of claim 6, further comprising:
- if the checking indicates the requestor is not associated with the one or more risk indications, accessing a credential database to identify a record of a plurality of records that corresponds to the authentication information of a user of the mobile device; and
- automatically inputting the authentication information into the one or more fields of the user interface.

8. The method of claim 6, wherein the altering the one or more fields of the user interface includes making the one or more fields of the user interface inactive.

9. The method of claim 6, wherein the authentication information includes personal information, financial information, and/or login information.

10. The method of claim 6, further comprising:
- detecting that information has been input into one or more fields contained in a user interface of the mobile device, the one or more fields corresponding to the authentication information; and
- implementing the intercepting the transmission of the authentication information prior to the authentication information being received by the requesting device.

11. The method of claim 6, wherein the identifying the requestor information corresponding to the requesting device includes analyzing a Secure Socket Layer (SSL) Certificate associated with the requesting device.

12. The mobile device of claim 1, wherein the operations further comprise overriding the one or more security measures in response to receiving, at the user interface on the mobile device, an instruction to override the one or more security measures.

13. The method of claim 6, further comprising overriding the one or more security measures in response to receiving, at the user interface on the mobile device, an instruction to override the one or more security measures.

14. A non-transitory computer-readable medium (CRM) having stored thereon computer-readable instructions executable to cause a computer system to perform operations comprising:
- analyzing a user interface on the mobile device, the analyzing including detecting a Hypertext Markup Language (HTML) element and/or a string associated with authentication information indicating a request for the authentication information;
- determining, based on the analyzing, that the authentication information has been requested from the mobile device by a requesting device;
- in response to the determining that authentication information has been requested by the requesting device, identifying requestor information corresponding to the requesting device;
- detecting that a user interface element corresponding to a transmission of the authentication information has been selected on the mobile device;
- accessing a blacklist database containing one or more risk indications indicating security risks to the mobile device;
- determining, based on the accessing, whether the requestor information is associated with the one or more risk indications; and
- in response to determining that the requestor information is associated with the one or more risk indications, implementing one or more security measures including intercepting the transmission of the authentication information prior to the authentication information being received by the requesting device and altering one or more fields of the user interface that correspond to the requested authentication information, the altering configured to prevent an entry of the requested authentication information into the mobile device and indicate to a user of the mobile device that the requestor information is associated with the one or more risk indications.

15. The non-transitory CRM of claim 14, wherein the identifying the requestor information corresponding to the requesting device includes analyzing a Secure Socket Layer (SSL) Certificate associated with the requesting device.

16. The non-transitory CRM of claim 14, wherein the authentication information includes personal information, financial information, and/or login information.

17. The non-transitory CRM of claim 14, wherein the altering the one or more fields of the user interface includes making the one or more fields of the user interface inactive.

18. The non-transitory CRM of claim 14, wherein the analyzing the user interface of the mobile device includes determining that the one or more fields contained in the user interface correspond to the authentication information.

19. The non-transitory CRM of claim 14, wherein the operations further comprise overriding the one or more security measures in response to receiving, at the user interface on the mobile device, an instruction to override the one or more security measures.

20. The non-transitory CRM of claim 14, wherein the operations further comprise:
    if the determining whether the requestor information is associated with the one or more risk indications indicates that the requestor is not associated with the one or more risk indications, accessing a credential database to identify a record of a plurality of records that corresponds to the authentication information of a user of the mobile device; and
    automatically inputting the authentication information into the one or more fields of the user interface.

* * * * *